Feb. 21, 1956 R. D. PHILBRICK 2,735,463
SAW WITH CARRYING CASE HANDLE
Filed July 9, 1954
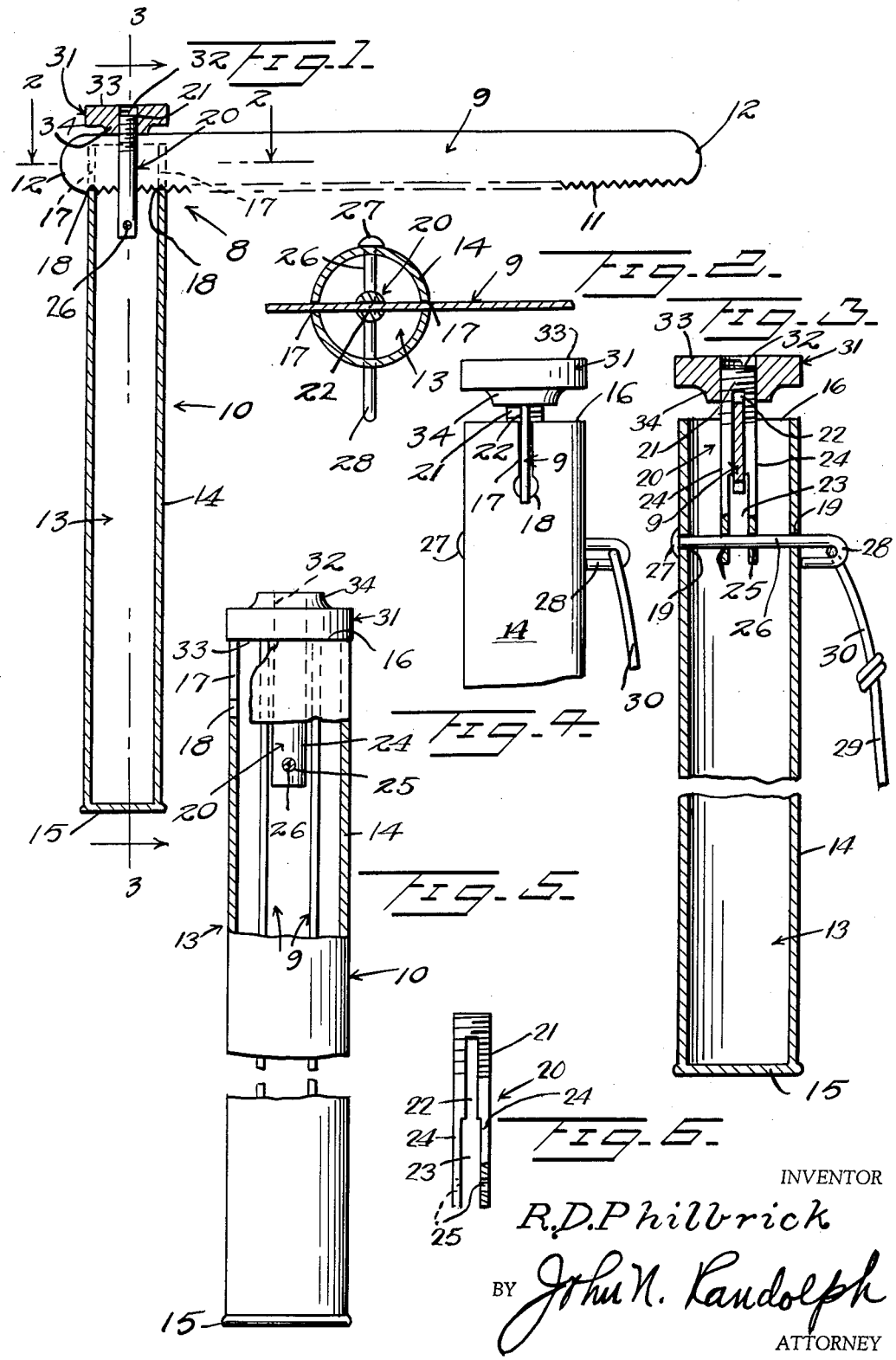
INVENTOR
R.D.Philbrick
BY John N. Randolph
ATTORNEY

United States Patent Office 2,735,463
Patented Feb. 21, 1956

2,735,463
SAW WITH CARRYING CASE HANDLE
Raymond D. Philbrick, Ericson, Nebr.

Application July 9, 1954, Serial No. 442,296

3 Claims. (Cl. 145—31)

This invention relates to a novel saw of extremely simple construction including a handle forming a carrying case for one or more saw blades and which, with the blade or blades disposed therein, may be readily carried in a garment pocket, in a pack or saddlebag, or which may be suspended from a garment belt without risk of a garment or other equipment being cut by the saw.

Another object of the invention is to provide a saw of the aforedescribed character which is primarily adapted for use by hunters of big game for dressing game and other similar operations, but which is likewise readily adapted for numerous other uses where a saw is required.

A further object of the invention is to provide a novel saw and more particularly a novel combination of saw handle and blade carrying case capable of being used with conventional saw blades and which due to its novel construction may be secured to a saw blade adjacent either end thereof or which may effectively support a broken saw blade in a position for use.

A further object of the invention is to provide a combination blade carrying case and handle by means of which a saw blade is mounted with the blade axis at a right angle to the axis of the handle or case so that less wrist leverage is required in using the saw than is needed where the handle is disposed at an angle other than 90° to the blade.

Numerous other objects and advantages of the invention will hereinafter become more fully apparent from the following description of the drawing, illustrating a presently preferred embodiment thereof, and wherein:

Figure 1 is a vertical sectional view of the combination carrying case and handle, partly in side elevation, and showing a saw blade in side elevation clamped in an end of the case in a position for use;

Figure 2 is an enlarged fragmentary sectional view taken substantially along a plane as indicated by the line 2—2 of Figure 1;

Figure 3 is an enlarged fragmentary sectional view taken longitudinally of the case, substantially along a plane as indicated by the line 3—3 of Figure 1;

Figure 4 is a fragmentary elevational view of the upper portion of the case, looking from left to right of Figure 1, and on an enlarged scale;

Figure 5 is an enlarged fragmentary side elevational view, partly broken away and partly in section, showing two saw blades stored in the case in a carrying position, and Figure 6 is an enlarged elevational view, partly in section, of one element of the saw.

Referring more specifically to the drawing, the improved saw in its entirety is designated generally 8 and includes a saw blade 9 and a combination handle and carrying case, designated generally 10. The saw blade 9 may be substantially of a conventional meat saw type having saw teeth 11 formed in one longitudinal edge thereof and extending substantially from end-to-end of the blade 9. However, unlike most conventional saw blades of the meat saw type, the blade 9 has corresponding rounded ends 12 and is preferably solid from end-to-end thereof and is not provided with openings adjacent its ends, as are provided in most conventional meat saw blades.

The combination handle and carrying case 10 includes a cylindrical walled body, designated generally 13, the cylindrical wall 14 of which is closed at one end thereof by an end wall 15, constituting the bottom of the case 13. The case 13 has an opposite open end 16, defined by the opposite end of its cylindrical wall 14. The wall 14 is provided with diametrically aligned corresponding slots 17, which extend longitudinally of the case 13 and which open outwardly of its open upper end 16. The slots 17 terminate at their inner or lower ends in diametrically aligned openings 18, which constitute enlargements on the inner ends of said slots. The cylindrical wall 14, beneath or inwardly of the openings 18, is provided with diametrically aligned openings 19 the axis of which are disposed at a right angle to the axis of the openings 18.

The combination case and handle 10 includes a bolt 20 of relatively large diameter having an externally threaded upper end portion 21. The bolt 20 is provided with a slot 22 which extends diametrically therethrough and longitudinally of said bolt from adjacent its threaded upper end 21 through its opposite lower end. The lower portion of the slot 22 is of increased width as seen at 23. The slot 22, 23 separates the portion of the bolt in which said slot is formed into corresponding furcations 24 which are provided with aligned openings 25, adjacent the lower end of the bolt 20. The lower end of the bolt 20 is positioned in the upper portion of the case 13 with the openings 25 thereof in alignment with the openings 19. An elongated pin 26 is then passed inwardly through one of the openings 19, thence through the two openings 25, and then outwardly through the other opening 19. The pin 26 has an externally rounded head 27 at one end thereof which is disposed on the outer side of the wall 14, around the first mentioned opening 19. The other shank end of the pin 26 extends outwardly a substantial distance from the case 13 and is turned inwardly and back upon itself to form a loop or eye 28, which functions as a stop together with the head 27, to retain the pin 26 in engagement with the openings 19 and 25. The loop or eye 28 additionally functions as a means for attaching a strand of flexible material 29, such as a strand of leather, to the case 13 and which strand is knotted to provide a loop 30, through which a garment belt can be passed, for suspending the carrying case 10 from a person's belt.

The case 10 also includes a cap 31, of substantially the same diameter as the outer diameter of the wall 14, which is provided with a central threaded bore 32 extending therethrough. One side 33 of the cap 31 is flat and the other side is provided with a boss or protuberance 34, disposed around an end of the threaded bore 32.

As illustrated in Figure 5, the combination handle and case 10 is capable of functioning as a carrying case for holding two blades 9 and is of a length so that when corresponding ends of the blades 9 are resting on the bottom 15, the other ends thereof will be flush with or will extend slightly above the open upper end 16 of the case, as illustrated in Figure 1. The cap or nut 31 is then screwed onto the upper threaded end 21 of the bolt with its flat side 33 downward and is advanced downwardly against the upper ends of the blades 9 to hold said blades tightly in the case 13 to prevent rattling thereof. The blades 9 straddle the pin 26 and bolt 20 and the internal diameter of the case 13 is sufficiently greater than the width of the blades 9 to accommodate a blade on each side of the bolt 20 and pin 26, and said case 13 may be of sufficient internal diameter to accommodate more than one blade on each side of the bolt and pin. With the blades 9 thus clamped immovably in the case 13, as seen in Figure 5, it will be readily apparent that the unit may be carried in a garment pocket, saddlebag or pack or hung by the loop 30 suspended from a belt without rattling and without risk of damaging the garment or equipment. When it is desired to use the saw 8, the cap or nut 31 is removed from the bolt 20 and both blades 9 are removed from the case 13. An end of one of the blades 9 is then inserted through one of the slots 17 and its opening 18, through the bolt slot 22 and its enlarged portion 23, and thence outwardly through the other slot 17 and its opening 18. The slots 17 and 22 are of a width to relatively snugly receive the blade 9 from its back or top edge to adjacent its cutting edge 11. The width of the cutting edge 11, due to the set of the teeth thereof, is substantially greater than the thickness of the remainder of the blade and the openings 18 and enlarged slot portion 23 are provided to accommodate the toothed edge 11 having this greater width or thickness. As previously stated, one end portion of the blade 9 is disposed in said aforementioned slots and openings of the combination handle and case 10, after which the cap or nut 31 is re-applied to the threaded upper bolt end 21 with its boss 34 in a lowermost position and is tightened against the back edge of the blade 9 to clamp said aforementioned blade end in the handle and case 10. Said blade end is clamped in the handle and case 10 between the boss 34 and the bottom portions of the openings 18. As seen in Figure 1, the notches between certain of the saw teeth 11 are disposed in alignment with portions of the wall 14 in which said openings 18 are formed, so that spaced pairs of teeth of the blade 9 straddle portions of the wall 14 located immediately beneath the openings 18. Thus the pointed ends of the teeth are not dulled by being clamped in the handle and case 10 and the blade 9 is securely clamped against sliding movement relatively to the handle and case. With the blade 9 thus disposed in an operative position as seen in Figure 1, the handle is grasped for operating the saw 8. The loop 28 will form a thumb or finger rest to prevent the hand gripping the case 13 from sliding relatively thereto. It will be obvious that either end of the blade 9 may be clamped, as heretofore described, in the case and handle so that when one end of the blade becomes dull, said blade may be reversed end for end. Also, it will be understood that the extra blade is available for use in the event that the original blade becomes broken or too dull for use and is removed from the case 13 and laid aside when the case is to be used as a part of the saw handle. The rounded blade end 12 will prevent puncturing of internal parts of an animal when the saw is used for quartering or halving a carcass.

However, it will be understood that the saw 10 is likewise well adapted for numerous other uses, and a part of a broken off saw blade, if of sufficient length, may be clamped in the handle and case 10 and utilized, especially in an emergency, where an extra blade is not available.

Various modifications and changes are contemplated and may obviously be resorted to, without departing from the spirit or scope of the invention as hereinafter defined by the appended claims.

I claim as my invention:

1. A saw of the character described comprising an elongated saw blade having a toothed edge extending substantially from end-to-end thereof and an opposite back edge, a combination case and handle comprising an elongated case having a closed bottom and an open top, said case having aligned slots extending longitudinally thereof and opening outwardly of the top of the case, a pin extending transversely through the case and disposed inwardly of the case with respect to said slots, a bolt having one end disposed within said case and an opposite threaded end projecting from the top of said case, said pin extending transversely through the bolt near the first mentioned inner end thereof for anchoring the bolt in the case, said bolt being provided with a longitudinally extending slot and being slidably movable on said pin to align the bolt slot with the slots of said case for accommodating an end of the saw blade in said slots of the case and bolt, said pin being disposed transversely of the saw blade, and a cap member threadedly engaging the outer threaded end of said bolt and bearing against the back edge of the saw blade for clamping the saw blade between said cap member and the inner ends of the slots of said case.

2. A saw as in claim 1, said case providing a housing for one or more saw blades arranged therein on one or both sides of the pin and bolt, said cap member being attached to the threaded end of said bolt for closing the top of the case when employed as a housing for the storage of saw blades and having a flat end facing inwardly of the case for engagement with the blade ends disposed adjacent the top of the case for retaining the opposite ends of the saw blades in engagement with the case bottom to prevent movement and rattling of the saw blades within said case.

3. A saw as in claim 1, said case slots having enlarged lower ends sized to slidably receive the toothed edge of the saw blade and upper portions of reduced width sized to snugly receive a portion of the saw blade disposed between said toothed edge and back edge, said bolt slot including an outer portion aligning with the outer portions of the case slots and of substantially the same width and an inner portion of greater width aligning with the enlarged inner ends of said case slots for accommodating a portion of the toothed edge of the saw blade loosely therein.

References Cited in the file of this patent

UNITED STATES PATENTS

| | | |
|---|---|---|
| 292,951 | Richardson | Feb. 5, 1884 |
| 399,695 | Rasnick | Mar. 19, 1889 |
| 458,552 | Olmstead | Aug. 25, 1891 |
| 1,706,681 | Stidhaur | Mar. 26, 1929 |
| 2,307,411 | Leatherman | Jan. 5, 1943 |